Feb. 4, 1964 C. J. SPERE 3,120,293
RETRACTABLE WATER BRAKE FOR HIGH VELOCITY TRACK VEHICLES
Filed Nov. 8, 1962 3 Sheets-Sheet 1

INVENTOR.
CHARLES J. SPERE
BY
ATTORNEYS

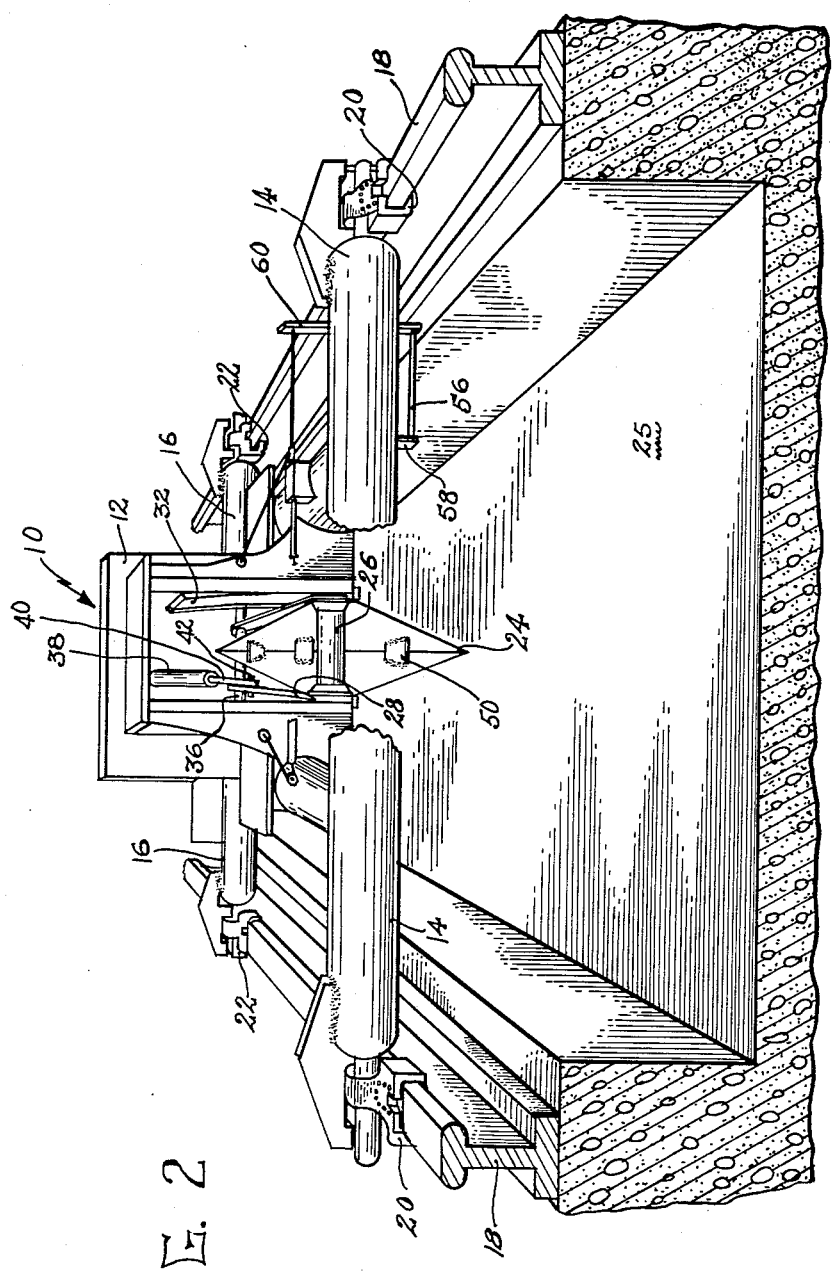

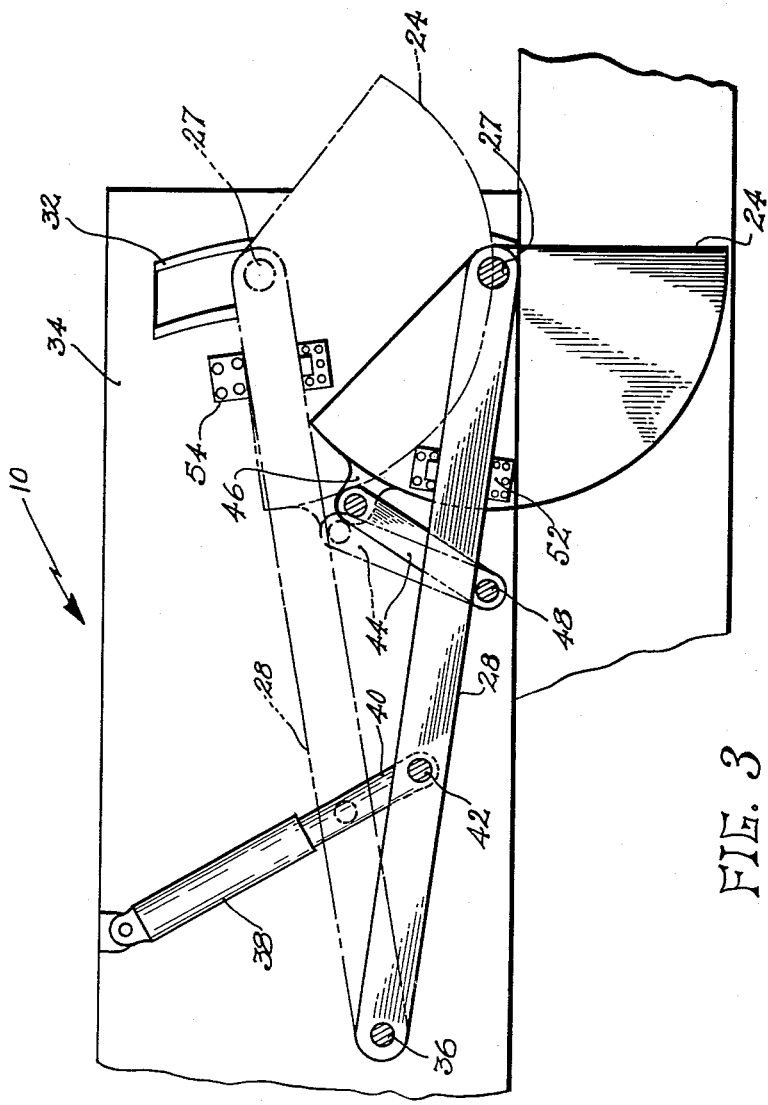

3,120,293
RETRACTABLE WATER BRAKE FOR HIGH VELOCITY TRACK VEHICLES
Charles J. Spere, Alamogordo, N. Mex., assignor to the United States of America as represented by the Secretary of the Air Force
Filed Nov. 8, 1962, Ser. No. 236,463
4 Claims. (Cl. 188—38)
(Granted under Title 35, U.S. Code (1952), sec. 266)

The invention described herein may be manufactured and used by or for the United States Government for governmental purposes without payment to me of any royalty thereon.

The present invention relates to a deceleration device for high velocity land sleds and more particularly relates to a water or other fluid brake which, when not in use, is retracted into the body of the sled to reduce aerodynamic drag during sled acceleration and travel, and is automatically lowered to braking position when the land sled reaches a selected point over a water trough or other fluid braking means.

In the use of bucket scoops which are lowered into a trough of water positioned beside or between vehicle tracks for deceleration or braking, an aerodynamic problem has arisen since the brake itself, scoops air, produces drag and becomes an impediment to acceleration and high velocity travel. While water is used most generally, it is to be understood that sand and similar materials may, under certain conditions, answer the term fluid.

The object of the present invention is the provision of a bucket scoop mounted to be raised and lowered in an arcuate path, and provided with a linkage device for pivoting the bucket so that the bucket opening presents the most advantageous face forward, providing a minimum of aerodynamic drag when raised, and a maximum scoop opening for maximum braking when lowered.

A further object of the invention is the provision of a latch device for maintaining the bucket brake in raised and retracted position, and an automatic means for releasing the latch and lowering the scoop to a position below sled level and into a braking trough provided therefor at a desired location along the track.

It is a still further object of this invention to provide a braking system which is economical to produce and utilizes conventional, currently available components that lend themselves to standard mass production manufacturing techniques.

These and other advantages, features and objects of the invention will become more apparent from the following description taken in connection with the illustrative embodiments in the accompanying drawings wherein:

FIGURE 2 is a rearward fragmentary perspective view of the device showing the trough and tracks in cross section.

FIGURE 3 is a side view of the bucket and linkage mounting, showing the down braking position of the bucket in full lines and the up position in dotted lines.

Figure 1:
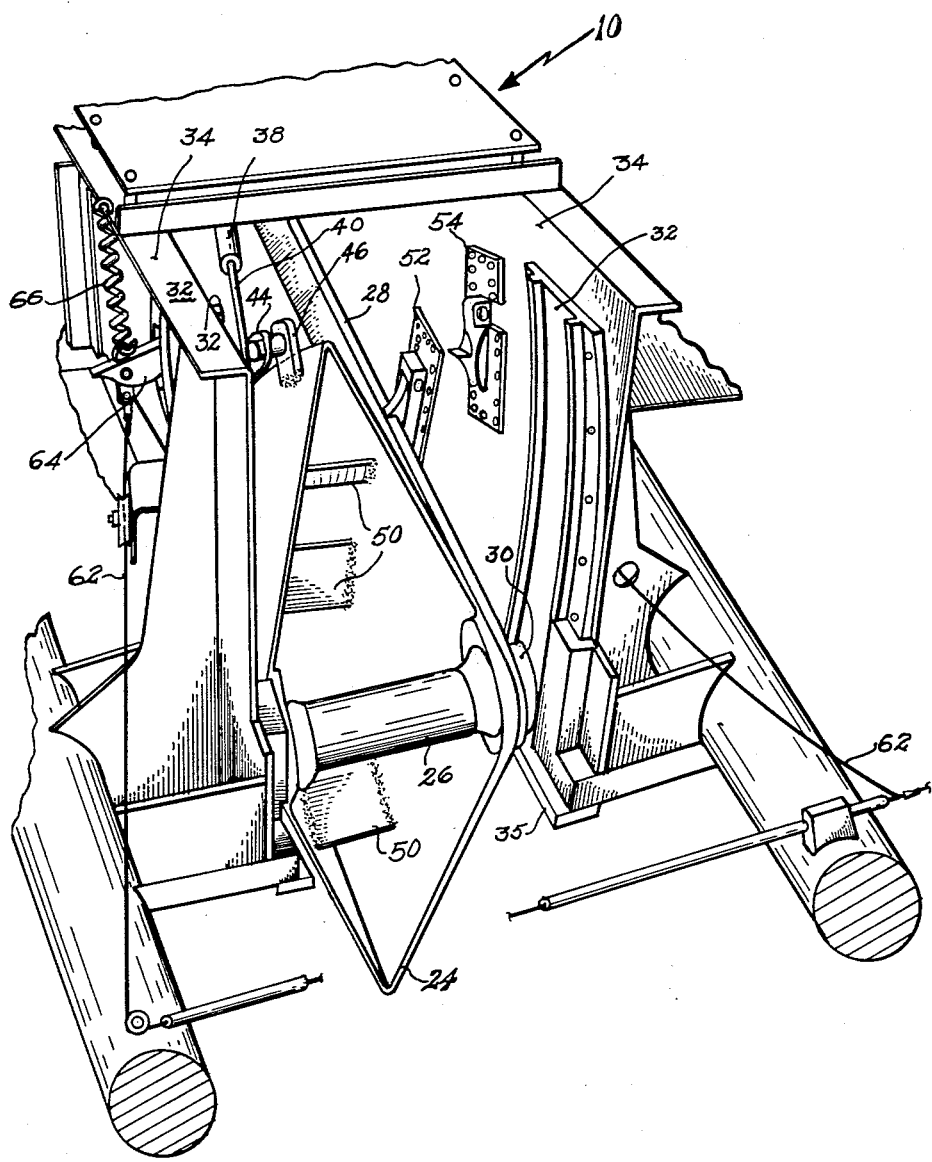
FIGURE 1 is a perspective view of the water scoop and its mounting looking in a rearward direction and showing the scoop lowered and latched into place in the braking position.

Referring more in detail to the drawing, wherein like reference numerals refer to like parts, the high velocity land sled is indicated generally by the numeral 10. It comprises a housing 12 (FIGURE 2) forward and rearward elements 14 and 16, and attaching means for securing the sled to the rails 18 of the ground trackway by expedient bracket and slipper means 20 and 22.

The bucket scoop or water brake 24 is rigidly mounted at its median forward portion to a trunnion element 26. A pivot pin 27 (FIGURE 3) passes through the trunnion member 26 (FIGURES 1 and 2), and the openings in the sides of the bucket 24, through openings in a pair of arms 28 and terminates in bearing members 30. The bearing members 30 are adapted to travel in arcuately formed channel members or trackways 32 which are secured to the vertical side walls 34 of the sled 10. The downward travel of the scoop is limited by the base 35 of the channel which functions as a stop.

It will be seen that the arms 28 have pivotal connection with the forward portions of the sides of the bucket 24. The arms 28 are provided at their rear ends with a stationary pivot in the pivot pin 36 mounted on the sled 10.

The arms 28 can be raised or lowered by any expedient means. The means shown in the drawing comprises hydraulic cylinder 38, whose piston rod 40 is pivoted at 42 to one of the arms 28.

It will now be seen that the bucket can be moved from an up position to a downward braking position where it enters a trough 25 provided at a desired location along the extent of the ground track. The trough contains water or, conceivably sand or other braking fluid. The device which causes automatic operation of the hydraulic cylinder 38 will be later described.

In addition to merely raising and lowering the bucket, the invention provides a unique device for tipping the bucket 24 to pivot about the trunnion 26 as it is raised and lowered, so that maximum forwardly facing bucket mouth opening is presented to the water or other braking medium, and minimum forwardly facing open mouth area is presented when the bucket is in raised position. In this manner, aerodynamic drag is reduced to a minimum. Thus, the bucket presents at all times the most advantageous face forward.

For accomplishing this purpose a link 44 is pivoted to the lug 46 located at the top of the bucket 24. The opposite end of the link 44 has a pivot 48 which is stationary with respect to the sled housing 12. In operation, when the arm 28 raises the bucket 24, the link 44 and stationary pivot 48 holds the lug 46 at the upper portion of the bucket at a substantially unchanged level and the bucket is tipped to the position shown in dotted lines in FIGURE 3.

Baffles 50, as shown in FIGURE 1, are added for additional braking action, and for redirection and control of the impacting fluid.

Pairs of spring biased latch members 52 and 54 are attached to each side wall 34 and engage the upper and lower surfaces respectively of the arms 28 to hold the scoop respectively in lowered and raised position. As noted, the scoop may be raised or lowered by any expedient means, such as the hydraulic cylinder 38 shown pivoted to an arm 28 at 42. In lowered position, the scoop 24 enters the water canal or trough 25 with its full open face exposed in the direction of movement of the sled.

In order to raise the scoop 24 to its uppermost position, hydraulic cylinder 38 is actuated until the arm 28 is engaged by latch 54. The latch 54 is held in its extended position to engage the bottom of link 28 by means of bell crank lever 64 to which a spring 66 is attached at one end. The other end of spring 66 is secured to the frame of the sled 10. Release of latch 54 is achieved by means of a cord or line 56 which is drawn taut between a fixed anchoring point 58 and an end of a lever 60 pivoted midway between its ends. A second cord or line 62 connects the other end of lever 60 and goes to the bell levers 64 located at the site of each of the latches 54. A series of pulleys and holes in the framework are provided to allow easy movement of the lines. When the sled is traveling down its rails and reaches a point at which braking action is desired, a knife or cutting means (not shown) positioned in the trough cuts cord 56, and because of the action of springs 66, lever 60 pivots allowing the bell levers 64 to withdraw latches 54. At this point the scoop 24 could be dropped by gravity, or alternatively, the action of link 60 could be utilized to operate a micro-switch to cause pressure from a conventional source to be applied to the cylinder 38 to force the scoop to its lowermost position. Spring biased latch 52 engages the top of links 28 and maintains the scoop in its braking position. Cord means (not shown) may be utilized for manually retracting the engaging portion of latches 54 to allow the bucket scoop to drop by gravity. The cord may also have operative connection with cylinder 38 for raising the scoop.

Although the invention has been described with reference to a particular embodiment, it will be understood by those skilled in the art that the invention is capable of a variety of alternative embodiments within the spirit and scope of the appended claims.

I claim:

1. A device for accomplishing the deceleration of a high velocity land sled, said device comprising a bucket scoop arranged for encountering braking fluid placed at a desired location, a pair of arms pivoted at the rearward ends thereof to a stationary pivot point on said sled, the forward ends of said arms being pivotally secured to said scoop at horizontally opposed locations adjacent the open face of said scoop, means for raising and lowering said arms in unison thereby raising and lowering said scoop, vertically positioned arcuate guide means on said sled for guiding said scoop, link means, a stationary pivot for the lower end of said link in said sled, the upper end of said link being pivotally secured to said bucket in the upper exterior region thereof, so that said scoop is tilted as it is lowered to maximum forwardly facing open area to provide maximum scooping contact with said braking fluid, and minimum forwardly facing open area when in raised position to cause a minimum of aerodynamic drag.

2. A device for effecting deceleration of a high velocity land sled, said device comprising a sled, a housing on said sled, spaced parallel vertical walls on said sled, a pair of coordinated, opposed, arcuate trackways on said vertical walls, a bucket scoop, means for mounting said scoop on said sled guided by said trackways for raising and lowering said scoop into and out of a braking medium located below the level of said sled, said means comprising a pair of arms having stationary pivots at their rearward ends in said sled, and forward ends being pivoted to opposite sides of said scoop at the forward exterior portion thereof and means for raising said arms, tilting means for tilting said scoop to present the maximum forwardly facing scooping area while lowered, and minimum scooping area when raised, said tilting means comprising a link, a stationary pivot for one end of said link in said sled, and a pivotal connection between the distal end of said link and the upper exterior portion of said bucket.

3. In the device as claimed in claim 2, a supporting latch located on one of said vertical walls for supporting said bucket in raised position, and means for releasing said latch, said means being operated by contact between said sled and an element located at a desired position along the course of travel of said sled.

4. A device for effecting deceleration of a high velocity land sled, said device comprising a bucket scoop, a mounting system for mounting said scoop on said sled comprising a housing having facing, vertical and parallel walls, arcuate channel members forming trackways on each of said vertical walls, a trunnion, bearing members on the ends of said trunnion adapted to engage and move in said trackways, pivot elements rigidly connecting said trunnion and said bearing elements, a pair of arms having a stationary pivot on said sled at their rearward ends, each forward end thereof having pivotal connection with a pivot element, each opposite side of said bucket scoop also being pivotally connected to a pivot element, means connected to one of said arms for moving said arms and with it said bucket scoop up and down along an arcuate pathway guided by said trackways, supporting latch means for supporting said arms, means for withdrawing said supporting latch, means for tilting said bucket scoop as it is raised, said means comprising a link having a stationary pivot at one end of said sled, the distal end of said link being pivoted to said bucket scoop at a position located on the upper exterior of said scoop.

References Cited in the file of this patent

UNITED STATES PATENTS

| 780,214 | Monnier | Jan. 17, 1905 |
| 2,844,220 | Muehlner | July 22, 1958 |